United States Patent
Bang

(10) Patent No.: US 12,405,172 B2
(45) Date of Patent: Sep. 2, 2025

(54) TEMPERATURE SENSING APPARATUS

(71) Applicant: HYUNDAI MOBIS Co., Ltd., Seoul (KR)

(72) Inventor: Tae Ho Bang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 518 days.

(21) Appl. No.: 17/827,715

(22) Filed: May 29, 2022

(65) Prior Publication Data

US 2023/0251142 A1    Aug. 10, 2023

(30) Foreign Application Priority Data

Feb. 7, 2022 (KR) .......... 10-2022-0015350

(51) Int. Cl.
- *G01K 7/16* (2006.01)
- *G01K 1/02* (2021.01)
- *G01K 3/00* (2006.01)

(52) U.S. Cl.
CPC ............... *G01K 7/16* (2013.01); *G01K 1/026* (2013.01); *G01K 3/005* (2013.01)

(58) Field of Classification Search
CPC .......... G01K 7/16; G01K 1/026; G01K 3/005; G01K 7/25
See application file for complete search history.

(56) References Cited

U.S. PATENT DOCUMENTS

| | | | |
|---|---|---|---|
| 2007/0170167 A1* | 7/2007 | Jeong | G01K 7/25 219/385 |
| 2020/0274375 A1* | 8/2020 | Griffiths | H02J 7/24 |

FOREIGN PATENT DOCUMENTS

| | | | | |
|---|---|---|---|---|
| DE | 10 2019 126 136 A1 | 4/2021 | | |
| EP | 0203350 A1 * | 4/1986 | | G01K 7/16 |
| EP | 2664905 A2 * | 11/2013 | | G01K 7/18 |
| WO | WO-9620394 A1 * | 7/1996 | | G01K 7/25 |
| WO | WO-2021058302 A1 * | 4/2021 | | G01K 1/20 |

OTHER PUBLICATIONS

Extended European Search Report issued in corresponding European Patent Application No. 22183619.0 dated Dec. 22, 2022.

* cited by examiner

*Primary Examiner* — Laura Martin
*Assistant Examiner* — Julia Fitzpatrick
(74) *Attorney, Agent, or Firm* — MORGAN, LEWIS & BOCKIUS LLP

(57) ABSTRACT

A temperature sensing apparatus includes a first voltage generator including a first resistor and a first temperature sensor, a second voltage generator that generates a control voltage, a voltage adjuster connected in parallel with the first resistor and that adjusts a voltage applied to the first temperature sensor based on the control voltage, and a controller that senses a temperature based on the voltage applied to the first temperature sensor, and the first temperature sensor is a device that converts a temperature into a voltage.

17 Claims, 5 Drawing Sheets

TEMPERATURE SENSING APPARATUS

CROSS-REFERENCE TO RELATED APPLICATION

This application claims the benefit of priority to Korean Patent Application No. 10-2022-0015350, filed in the Korean Intellectual Property Office on Feb. 7, 2022, the entire contents of which are incorporated herein by reference.

TECHNICAL FIELD

The present disclosure relates to a temperature sensing apparatus.

BACKGROUND

With the rapid development of vehicle-related technologies, recently released vehicles are equipped with dozens of controllers to control various electronic functions such as an ABS, an EPS, an ADAS, and the like.

In general, an output of a temperature sensor is an important factor in determining operations of devices in a vehicle. Therefore, one of the important requirements of vehicle-related companies is the accuracy of temperature sensors. In addition, to satisfy requirements of a vehicle functional safety, it is important whether the failure of each circuit can be determined.

A negative temperature coefficient of resistance (an NTC) is commonly used for the temperature sensors. Since a resistance value of the NTC changes depending on a temperature, it is possible to sense the temperature, based on a voltage applied to the NTC depending on the temperature by providing a resistance divider circuit. However, in the NTC, the resistance value changes non-linearly depending on the temperature, and the change in the resistance value is not large in a high temperature section.

SUMMARY

The present disclosure has been made to solve the above-mentioned problems occurring in the prior art while advantages achieved by the prior art are maintained intact.

An aspect of the present disclosure provides a temperature sensing apparatus that accurately senses a temperature in all sections.

An aspect of the present disclosure provides a temperature sensing apparatus capable of preventing a decrease in temperature sensing accuracy in a high temperature section that occurs as a change in resistance value in the high temperature section is not large in an NTC.

An aspect of the present disclosure provides a temperature sensing apparatus capable of determining a failure of a temperature sensor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a temperature sensing apparatus includes a first voltage generator including a first resistor and a first temperature sensor, a second voltage generator that generates a control voltage, a voltage adjuster connected in parallel with the first resistor and that adjusts a voltage applied to the first temperature sensor based on the control voltage, and a controller that senses a temperature based on the voltage applied to the first temperature sensor, and the first temperature sensor is a device that converts a temperature into a voltage.

According to an embodiment, the voltage adjuster may include a second resistor and a switch.

According to an embodiment, the switch may be operated in response to the control voltage.

According to an embodiment, the second voltage generator may generate the control voltage applied to the switch.

According to an embodiment, the switch may include at least one of a MOSFET, a BJT, and a switch capable of controlling on/off of a circuit.

According to an embodiment, the second voltage generator may include a third resistor and a second temperature sensor, and the second temperature sensor may be a device that converts a temperature into a voltage.

According to an embodiment, the second voltage generator may control the voltage adjuster, based on a voltage applied to the second temperature sensor.

According to an embodiment, the first temperature sensor and the second temperature sensor may be disposed adjacent to each other.

According to an embodiment, the controller may sense the temperature, based on a voltage applied to the second temperature sensor.

According to an embodiment, a resistance value of the first resistor may be the same as a resistance value of the third resistor.

According to an embodiment, the controller may sense the temperature based on the voltage applied to the second temperature sensor in a specified section, and may sense the temperature based on the voltage applied to the first temperature sensor in a section other than the specified section.

According to an embodiment, the second voltage generator may control the voltage adjuster at a threshold temperature to increase a level of the voltage applied to the first temperature sensor.

According to another aspect of the present disclosure, a temperature sensing apparatus includes a first resistor, a first NTC resistor connected in series with the first resistor, a switch and a second resistor connected in series with each other and connected in parallel with the first resistor, a third resistor and a second NTC resistor that generate a divided voltage applied to the switch, and a controller that senses a temperature based on a first voltage applied to the first NTC resistor.

According to an embodiment, a resistance value of the first resistor may be the same as a resistance value of the third resistor.

According to an embodiment, the switch may be short-circuited when the divided voltage is less than or equal to a preset value.

According to an embodiment, a combined resistance of the first resistor and the second resistor may be connected in series with the first NTC resistor, when the switch is short-circuited.

According to an embodiment, a resistance value of the third resistor may be set to short the switch at a threshold temperature.

According to an embodiment, the first NTC resistor and the second NTC resistor may be disposed adjacent to each other.

According to an embodiment, the controller may sense the temperature, based on a second voltage applied to the second NTC resistor.

According to an embodiment, the controller may determine the temperature based on the first voltage as the sensed temperature when the temperature based on the first voltage is less than or equal to a first temperature or is greater than a second temperature, and may determine the temperature based on the second voltage as the sensed temperature when the temperature based on the second voltage exceeds the first temperature and is less than or equal to the second temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
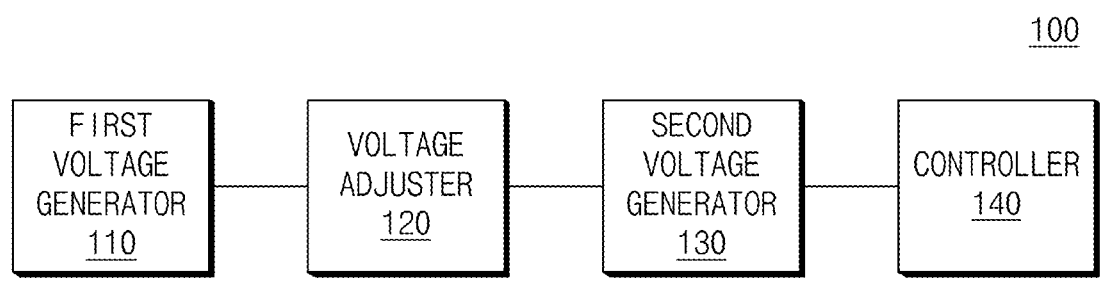
FIG. 1 is a block diagram illustrating a temperature sensing apparatus, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a temperature sensing apparatus, according to an embodiment of the present disclosure.

Referring to FIG. 1, a temperature sensing apparatus 100 according to an embodiment of the present disclosure may include a first voltage generator 110, a voltage adjuster 120, a second voltage generator 130, and a controller 140 (which includes a circuit, or a storage with instructions and a processor, to perform various functions/operations described with reference to the controller 140).

The first voltage generator 110 may include a first resistor and a first temperature sensor. For example, the first temperature sensor may be a device that converts a temperature into a voltage. As another example, the first temperature sensor may include a first NTC resistor. As another example, a resistance value of the first temperature sensor may change depending on the temperature. As another example, the first resistor and the first temperature sensor may be connected in series to each other. Also, the first voltage generator 110 may include a power source for supplying a voltage divided by the first resistor and the first temperature sensor. For example, the power source may supply 5V to the first resistor and the first temperature sensor. In this case, the first resistor and the first temperature sensor may divide the voltage supplied from the power source. According to an embodiment, the controller 140 may receive a voltage applied to the first temperature sensor.

The voltage adjuster 120 may be connected in parallel with the first resistor. For example, the voltage adjuster 120 may adjust a voltage applied to the first temperature sensor. As another example, the voltage adjuster 120 may include a second resistor and a switch. According to the embodiment, since the second resistor is connected in parallel with the first resistor when the switch is shorted, a combined resistance is formed such that a higher voltage can be applied to the first temperature sensor. According to another embodiment, since the second resistor does not form a combined resistance with the first resistor when the switch is opened, an existing circuit in which the first temperature sensor and the first resistor are connected in series may be formed. In an embodiment, the switch may operate by receiving a voltage generated from the second voltage generator 130. In an embodiment, the switch may include a switch capable of on/off control of a circuit including a MOSFET, a BJT, or the like.

The second voltage generator 130 may generate a control voltage. For example, the control voltage generated from the second voltage generator 130 may be applied to a switch included in the voltage adjuster 120, and the switch included in the voltage adjuster 120 may operate based on the control voltage.

The second voltage generator 130 may include a third resistor and a second temperature sensor. For example, the second temperature sensor may be a device that converts a temperature into a voltage. As another example, the second temperature sensor may include a second NTC resistor. The resistance value of the second temperature sensor may change according to a temperature. Also, the second voltage generator 130 may include a power source for supplying a voltage divided by the third resistor and the second temperature sensor. For example, the power source may supply 5V to the first resistor and the first temperature sensor. In this case, the third resistor and the second temperature sensor may generate a control voltage by dividing a voltage supplied from the power source, and the generated control voltage may be applied to a switch included in the voltage adjuster 120. In an embodiment, the second voltage generator 130 may control the voltage adjuster 120 at a threshold temperature to increase the voltage that is applied to the first temperature sensor.

In an embodiment, the control voltage may be a voltage applied to the second temperature sensor. For example, the second voltage generator 130 may control the voltage adjuster 120, based on a voltage applied to the second temperature sensor. As another example, the second voltage generator 130 may control an operation of the switch by applying a voltage applied to the second temperature sensor to the switch included in the voltage adjuster 120. According to an embodiment, when the temperature increases, the resistance value of the second temperature sensor may decrease, and accordingly, a level of the control voltage that is the voltage applied to the second temperature sensor may decrease, and the switch may be short-circuited.

In an embodiment, a level of the third resistor may be set depending on a temperature at which the switch included in the voltage adjuster 120 is short-circuited. For example, when it is determined to short-circuit the switch at the set temperature, a size of the third resistor may be set based on a voltage value for shorting the switch, a voltage value of the second temperature sensor at the set temperature, and voltage values of power sources included in the first voltage generator 110 and the second voltage generator 130.

In an embodiment, the first temperature sensor included in the first voltage generator 110 and the second temperature sensor included in the second voltage generator 130 may be disposed adjacent to each other. For example, the first temperature sensor and the second temperature sensor may be disposed adjacent to each other to have the same temperature. According to an embodiment, the first temperature sensor and the second temperature sensor may be disposed to have a distance of 1 cm or less.

According to an embodiment, a resistance value of the first resistor may be the same as a resistance value of the third resistor. For example, when the first resistor and the third resistor have the same resistance value, a division voltage divided through the first resistor and the first temperature sensor and a division voltage divided through the second resistor and the second temperature sensor may have the same value.

The controller 140 may sense a temperature based on a voltage applied to the first temperature sensor. For example, when a temperature increases, a size of the first temperature sensor decreases and a level of voltage applied to the first temperature sensor decreases, and when a temperature decreases, the size of the first temperature sensor increases and the level of the voltage applied to the first temperature sensor increases. Accordingly, the controller 140 may sense a temperature based on the level of the voltage applied to the first temperature sensor. In one embodiment, the controller 140 may include an MCU or an ECU.

According to an embodiment, when the temperature increases above the set temperature, the second voltage generator 130 may generate a control voltage that short-circuits the switch, and the switch to which the control voltage is applied may be short-circuited. When the switch is short-circuited, the second resistor may form a combined resistance with the first resistor, and the resistor connected to the first temperature sensor may decrease in size, such that the voltage applied to the first temperature sensor may increase, and thus the controller 140 may accurately sense the temperature above the set temperature. That is, even at a high temperature, the controller 140 may accurately sense the temperature based on the level of the voltage applied to the first temperature sensor.

The controller 140 may sense a temperature based on a voltage applied to the second temperature sensor included in the second voltage generator 130. For example, the controller 140 may sense the temperature based on a voltage applied to the first temperature sensor and a voltage applied to the second temperature sensor. For another example, the controller 140 may sense the temperature based on the voltage applied to the second temperature sensor in a specified section, and may sense the temperature based on the voltage applied to the first temperature sensor in a section other than the specified section. In this case, the specified section may be a section for changing the switch included in the voltage adjuster 120 from an open state to a short-circuited state.

In one embodiment, since the controller 140 may sense the temperature through both the first temperature sensor and the second temperature sensor, when one NTC resistor or a circuit including the NTC resistor fails, the controller 140 may sense the failure. That is, when a failure is sensed, the controller 140 may inform a user of the corresponding fact.

According to an embodiment of the present disclosure, a temperature sensing apparatus may accurately sense a temperature in all sections.

According to an embodiment of the present disclosure, a temperature sensing apparatus may prevent a decrease in temperature sensing accuracy in a high temperature section that occurs as a change in resistance value in the high temperature section is not large in an NTC.

In addition, according to an embodiment of the present disclosure, even when one NTC or a circuit including the NTC fails, a temperature sensing apparatus may sense a temperature using the other NTC and may determine a failure of the corresponding circuit.

In addition, according to an embodiment of the present disclosure, a temperature sensing apparatus may maintain the sensing accuracy up to a high temperature only by an operation of the circuit itself without receiving a control signal from an MCU.

According to an embodiment of the present disclosure, a temperature sensing apparatus may maintain a temperature sensing accuracy up to a high temperature even in the case of other devices that convert a temperature into a voltage, other than the NTC.

Figure 2:
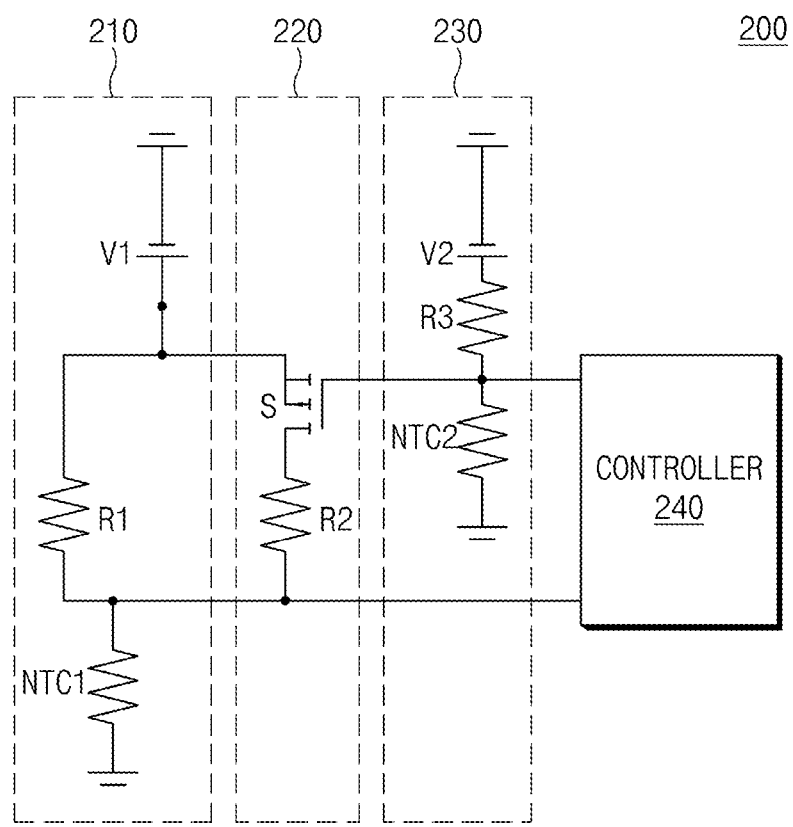
FIG. 2 is a diagram illustrating a temperature sensing apparatus, according to an embodiment of the present disclosure.

FIG. 2 is a diagram illustrating a temperature sensing apparatus, according to an embodiment of the present disclosure.

Referring to FIG. 2, a temperature sensing apparatus 200 according to an embodiment of the present disclosure may include a first resistor R1, a first power source V1, a first NTC resistor NTC1, a switch 'S', a second resistor R2, a third resistor R3, a second NTC resistor NTC2, a second power source V2, and a controller 240. In an embodiment, the temperature sensing apparatus 200 may be included in the temperature sensing apparatus 100 of FIG. 1. According to an embodiment, the first NTC resistor NTC1 may correspond to the first temperature sensor of FIG. 1, and the second NTC resistor NTC2 may correspond to the second temperature sensor of FIG. 1. That is, according to an embodiment, the first NTC resistor NTC1 may be included in the first voltage generator 110 of FIG. 1, and the second NTC resistor NTC2 may be included in the second voltage generator 130 of FIG. 1.

The first resistor R1 may be connected in series with the first NTC resistor NTC1. Also, the first resistor R1 may be connected in series with the first power source V1. Accordingly, the voltage supplied by the first power source V1 may be divided through the first resistor R1 and the first NTC resistor NTC1, and may generate a first voltage applied to the first NTC resistor NTC1. For example, a resistance value of the first NTC resistor NTC1 may change depending on a temperature. In some embodiments, the first resistor R1 may include a plurality of resistors.

The switch 'S' may be connected in parallel with the first resistor R1. In addition, the first power source V1 may be connected to one end of the switch 'S'. In an embodiment, the switch 'S' may include a MOSFET or a BJT.

The second resistor R2 may be connected in series with the switch 'S'. In addition, the second resistor R2 may be connected in parallel with the first resistor R1. For example, when the switch 'S' is short-circuited, the second resistor R2 may be connected in parallel with the first resistor R1 to form a combined resistance. For another example, when the switch 'S' is opened, the second resistor R2 is not connected to the first resistor R1, and thus a combined resistance may not be formed. In some embodiments, since a resistance value of the combined resistance of the first resistor R1 and the second resistor R2 is less than the resistance value of the first resistor R1, when the second resistor R2 and the first resistor R1 form a combined resistance (e.g., when the switch 'S' is short-circuited), a larger voltage may be applied to the first NTC resistor NTC1. In an embodiment, the second resistor R2 may include a plurality of resistors.

The switch 'S' may receive a divided voltage generated through the third resistor R3 and the second NTC resistor NTC2. For example, an operation of the switch 'S' may be controlled through an applied division voltage. For another example, the switch 'S' may be short-circuited when the divided voltage is less than or equal to a preset value, and may be opened when the divided voltage is greater than the preset value.

The third resistor R3 and the second NTC resistor NTC2 may be connected in series to each other. One end of the third resistor R3 may be connected to the second power source V2. Accordingly, a voltage supplied from the second power source V2 may be divided through the third resistor R3 and the second NTC resistor NTC2, and a divided voltage may be generated. According to an embodiment, the generated division voltage may be applied to the switch 'S'.

In an embodiment, the resistance value of the second NTC resistor NTC2 may be changed depending on a temperature.

In an embodiment, the resistance value of the third resistor R3 may be the same as the resistance value of the first resistor R1.

In an embodiment, the voltage value of the first power source V1 may be the same as the voltage value of the second power source V2.

In an embodiment, the third resistor R3 may include a plurality of resistors.

In an embodiment, the resistance value of the third resistor R3 may be set to short-circuit the switch 'S' at a threshold temperature.

In an embodiment, the first NTC resistor NTC1 and the second NTC resistor NTC2 may be disposed adjacent to each other. For example, the first NTC resistor NTC1 and the second NTC resistor NTC2 may be disposed to have the same temperature. As another example, the first NTC resistor NTC1 and the second NTC resistor NTC2 may be disposed to have a distance of 1 cm or less.

The controller 240 may receive a first voltage applied to the first NTC resistor NTC1 and may sense a temperature based on the first voltage. For example, when the first voltage increases, the controller 240 may sense that the temperature is low, and when the first voltage decreases, the controller 240 may sense that the temperature is high. As another example, the controller 240 may store in advance a table of the first voltage depending on the temperature, and may sense the temperature based on the table.

The controller 240 may sense the temperature based on the second voltage applied to the second NTC resistor NTC2. For example, the controller 240 may receive a second voltage applied to the second NTC resistor NTC2 and may sense the temperature based on the second voltage. In an embodiment, the controller 240 may sense the temperature based on the first voltage when it is less than or equal to a first temperature or when it is greater than a second temperature, and may sense the temperature based on the second voltage when it exceeds the first temperature and is less than or equal to the second temperature. For example, a section when it exceeds the first temperature and is less than or equal to the second temperature may be a section in which the switch 'S' is changed from an open state to a short-circuited state.

In an embodiment, when the resistance values of the first resistor R1 and the third resistor R3 are the same, the controller 240 may sense the temperature based on any one of the first voltage and the second voltage when the temperature is below the first temperature.

In an embodiment, since the controller 240 may sense the temperature based on the first voltage and the second voltage, when an abnormality occurs in any one of the first voltage and the second voltage, the controller 240 may detect the occurrence of the abnormality based on the other voltage. In addition, the controller 240 may sense a temperature based on a voltage at which an abnormality does not occur, and may inform the user that a problem occurs in a circuit corresponding to the abnormal voltage.

In the temperature sensing apparatus 200 according to an embodiment of the present disclosure, when the temperature increases, the resistance value of the second NTC resistor NTC2 may decrease, and the second voltage (the divided voltage) applied to the second NTC resistor NTC2 may decrease, such that the switch 'S' may be short-circuited. When the switch 'S' is short-circuited, the first resistor R1 and the second resistor R2 may form a combined resistance, a first voltage greater than before the combined resistance is formed may be applied to the first NTC resistor NTC1, and the controller 240 may sense the temperature based on the first voltage. Accordingly, the temperature sensing apparatus 200 may solve the problem that an amount of change in the resistance value of the NTC resistor is lowered at a high temperature.

In an embodiment, the first resistor R1 and the first NTC resistor NTC1 may be included in a first voltage generator 210. In an embodiment, the second resistor R2 and the switch 'S' may be included in a voltage adjuster 220. In an embodiment, the third resistor R3 and the second NTC resistor NTC2 may be included in a second voltage generator 230. In one embodiment, the first voltage generator 210, the voltage adjuster 220, the second voltage generator 230, and the controller 240 may be actually the same as the first voltage generator 110, the voltage adjuster 120, the second voltage generator 130, and the controller 140 of FIG. 1, respectively.

Figure 3:
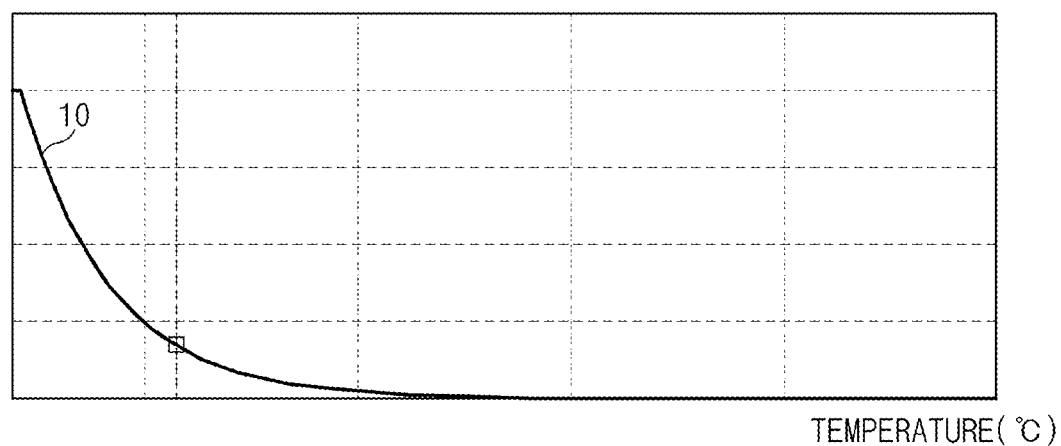
FIG. 3 is a diagram illustrating a change in a voltage applied to an NTC according to a temperature.

FIG. 3 is a diagram illustrating a change in a voltage applied to an NTC according to a temperature.

Referring to FIG. 3, in the case of an NTC resistor without a voltage adjuster (e.g., the voltage adjuster 120 of FIG. 1 or the voltage adjuster 220 of FIG. 2), the amount of change in a magnitude 10 of the applied voltage decreases as the temperature increases. That is, it is difficult for the controller (e.g., the controller 140 of FIG. 1 or the controller 240 of FIG. 2) to sense the temperature accurately at a high temperature based on the magnitude 10 of the voltage applied to the NTC resistor.

Figure 4:
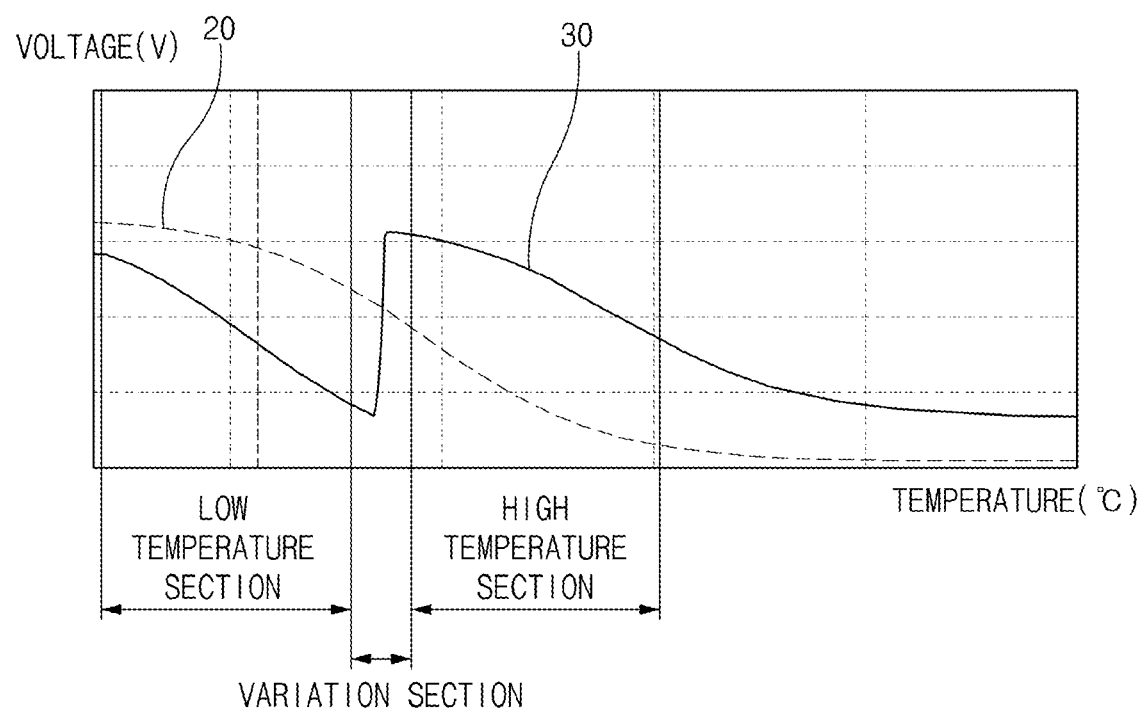
FIG. 4 is a diagram illustrating a change in a voltage applied to a plurality of NTCs in a temperature sensing apparatus, according to an embodiment of the present disclosure.

FIG. 4 is a diagram illustrating a change in a voltage applied to a plurality of NTCs in a temperature sensing apparatus, according to an embodiment of the present disclosure.

Referring to FIG. 4, the temperature sensing apparatus (e.g., the temperature sensing apparatuses 100 and 200 of FIGS. 1 and 2) according to an embodiment of the present disclosure may sense a temperature based on a magnitude 30 of a voltage applied to the first NTC resistor and the magnitude 20 of the voltage applied to the second NTC resistor. A low temperature section may be a section below the first temperature, a variation section may be a section above the first temperature and below the second temperature, and the high temperature section may be a section above the second temperature. For example, the variation section may be a section in which the switch 'S' of FIG. 2 is changed from an open state to a short-circuited state.

The magnitude 30 of the voltage applied to the first NTC resistor may continuously decrease as the temperature rises in the low temperature section. Also, in the variation period, as the switch 'S' is short-circuited, the magnitude 30 of the voltage applied to the first NTC resistor may increase. In addition, since the switch 'S' is completely short-circuited in the high temperature section, the magnitude of the resistor connected to the first NTC resistor decreases, such that the magnitude 30 of the voltage applied to the first NTC resistor may increase as in the low temperature section. Accordingly, a temperature sensing apparatus may accurately sense the temperature based on the magnitude 30 of the voltage applied to the first NTC resistor.

Comparing the magnitude 30 of the voltage applied to the first NTC resistor with the magnitude 20 of the voltage applied to the second NTC resistor, since the rate of change of the magnitude 30 of the voltage applied to the first NTC resistor in the high temperature section is greater than the rate of change of the magnitude 20 of the voltage applied to the second NTC resistor is 20, the temperature sensing apparatus may more accurately sense the temperature based on the magnitude 30 of the voltage applied to the first NTC resistor.

Figure 5:
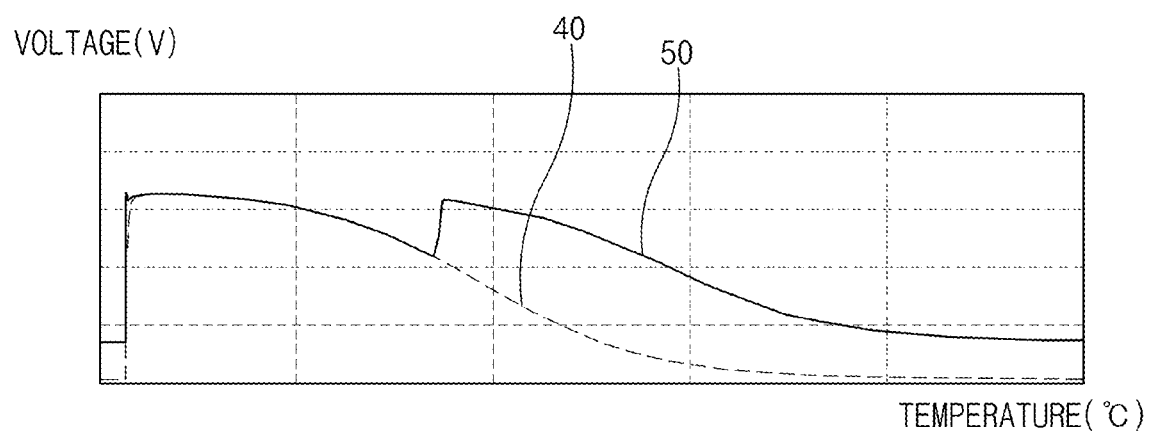
FIG. 5 is a diagram illustrating a change in a voltage applied to a plurality of NTCs in a temperature sensing apparatus, according to another embodiment of the present disclosure.

FIG. 5 is a diagram illustrating a change in a voltage applied to a plurality of NTCs in a temperature sensing apparatus, according to another embodiment of the present disclosure.

Referring to FIG. 5, the temperature sensing apparatus (e.g., the temperature sensing apparatuses 100 and 200 of FIGS. 1 and 2) according to an embodiment of the present disclosure may sense a temperature based on a magnitude 50 of a voltage applied to the first NTC resistor and a magnitude 40 of the voltage applied to the second NTC resistor.

In FIG. 5, the resistance values of the first resistor (the first resistor R1 in FIG. 2) and the third resistor (the third resistor R3 in FIG. 2) may be the same. In this case, in a low temperature section, the magnitude 50 of the voltage applied to the first NTC resistor and the magnitude 40 of the voltage applied to the second NTC resistor may be the same. Therefore, a temperature sensing apparatus may obtain the same result even when sensing the temperature based on any one of the magnitude 50 of the voltage applied to the first NTC resistor and the magnitude 40 of the voltage applied to the second NTC resistor.

In the high temperature section, as in FIG. 4, since the magnitude 50 of the voltage applied to the first NTC resistor increases as the switch 'S' is short-circuited, the temperature sensing apparatus may more accurately sense the temperature based on the magnitude 50 of the voltage applied to the first NTC resistor.

According to an embodiment of the present disclosure, a temperature sensing apparatus may accurately sense a temperature in all sections.

According to an embodiment of the present disclosure, a temperature sensing apparatus may prevent a decrease in temperature sensing accuracy in a high temperature section that occurs as a change in resistance value in the high temperature section is not large in an NTC.

According to an embodiment of the present disclosure, even when one NTC or a circuit including the NTC fails, a temperature sensing apparatus may sense a temperature using the other NTC and may determine a failure of the corresponding circuit.

According to an embodiment of the present disclosure, a temperature sensing apparatus may maintain the sensing accuracy up to a high temperature only by an operation of the circuit itself without receiving a control signal from an MCU.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A temperature sensing apparatus comprising:
a first voltage generator including a first resistor and a first temperature sensor;
a second voltage generator includes a third resistor and a second temperature sensor and configured to generate a control voltage in response to a temperature being sensed;
a voltage adjuster connected in parallel with the first resistor and configured to adjust a voltage applied to the first temperature sensor based on the control voltage; and
a controller, different from the second voltage generator, configured to sense the temperature based on at least one of the voltage applied to the first temperature sensor and the control voltage, and
wherein the first temperature sensor is a device configured to convert a temperature into a voltage, and
the third resistor and the second temperature sensor are configured to generate the control voltage applied to a switch included in the voltage adjuster, such that the switch is turned on/off in response to the temperature.

2. The temperature sensing apparatus of claim 1, wherein the voltage adjuster includes a second resistor and the switch.

3. The temperature sensing apparatus of claim 2, wherein the switch is operated in response to the control voltage.

4. The temperature sensing apparatus of claim 2, wherein the switch includes at least one of a MOSFET, a BJT, and a switch capable of controlling on/off of a circuit.

5. The temperature sensing apparatus of claim 1, wherein the second temperature sensor is a device configured to convert a temperature into a voltage.

6. The temperature sensing apparatus of claim 5, wherein the second voltage generator is configured to control the voltage adjuster, based on the voltage applied to the second temperature sensor.

7. The temperature sensing apparatus of claim 5, wherein the first temperature sensor and the second temperature sensor are disposed adjacent to each other, and are connected differently with respect to the switch.

8. The temperature sensing apparatus of claim 5, wherein a resistance value of the first resistor is the same as a resistance value of the third resistor.

9. The temperature sensing apparatus of claim 1, wherein the controller is configured to sense the temperature based on the control voltage in one section, and sense the temperature based on the voltage applied to the first temperature sensor in another section other than the one section.

10. The temperature sensing apparatus of claim 1, wherein the second voltage generator is configured to control the voltage adjuster at a threshold temperature to increase a level of the voltage applied to the first temperature sensor.

11. A temperature sensing apparatus comprising:
a first resistor;
a first negative temperature coefficient (NTC) resistor connected in series with the first resistor;
a switch and a second resistor connected in series with each other and connected in parallel with the first resistor;
a third resistor and a second NTC resistor configured to, in response to a temperature being sensed, generate a divided voltage applied to the switch such that the switch is turned on/off in response to the temperature; and
a controller configured to sense a temperature, based on at least one of a first voltage applied to the first NTC resistor and a second voltage applied to the second NTC resistor,
wherein one end of the third resistor, connected to the second NTC resistor, is also connected to the switch such that the divided voltage output between the third resistor and the second NTC resistor is applied to the switch.

12. The temperature sensing apparatus of claim 11, wherein a resistance value of the first resistor is the same as a resistance value of the third resistor.

13. The temperature sensing apparatus of claim 11, wherein the switch is short-circuited when the divided voltage is less than or equal to a preset value.

14. The temperature sensing apparatus of claim 11, wherein a combined resistance of the first resistor and the second resistor is connected in series with the first NTC resistor when the switch is short-circuited.

15. The temperature sensing apparatus of claim 11, wherein a resistance value of the third resistor is set to short the switch at a threshold temperature.

16. The temperature sensing apparatus of claim 11, wherein the first NTC resistor and the second NTC resistor are disposed adjacent to each other.

17. The temperature sensing apparatus of claim 11, wherein the controller is configured to determine the temperature based on the first voltage as the sensed temperature when the temperature based on the first voltage is less than or equal to a first temperature or is greater than a second temperature, and determine the temperature based on the second voltage as the sensed temperature when the temperature based on the second voltage exceeds the first temperature and is less than or equal to the second temperature.

* * * * *